United States Patent
Zhu

(10) Patent No.: US 8,263,159 B2
(45) Date of Patent: Sep. 11, 2012

(54) FROZEN PRODUCT AND METHOD FOR ITS PRODUCTION

(75) Inventor: Shiping Zhu, Sharnbrook (GB)

(73) Assignee: Conopco Inc., Englewood Cliffs, NJ (US)

( * ) Notice: Subject to any disclaimer, the term of this patent is extended or adjusted under 35 U.S.C. 154(b) by 384 days.

(21) Appl. No.: 12/313,705

(22) Filed: Nov. 24, 2008

(65) Prior Publication Data

US 2009/0142462 A1 Jun. 4, 2009

(30) Foreign Application Priority Data

Nov. 30, 2007 (EP) .................................... 07122023

(51) Int. Cl.
*A23G 9/004* (2006.01)

(52) U.S. Cl. ........................................ 426/516; 426/524

(58) Field of Classification Search .................. 426/512, 426/515, 516, 518, 524, 565, 100, 249, 101; 62/306, 342; 366/149, 156.1; 425/207, 208
See application file for complete search history.

(56) References Cited

U.S. PATENT DOCUMENTS

| | | | |
|---|---|---|---|
| 3,678,702 A | 7/1972 | Turner et al. | |
| 3,708,992 A * | 1/1973 | Clearman et al. | 62/71 |
| 5,919,510 A * | 7/1999 | Fayard et al. | 426/565 |
| 6,120,813 A | 9/2000 | Barnes et al. | |
| 6,134,908 A | 10/2000 | Brunner et al. | |
| 6,207,213 B1 | 3/2001 | Groux et al. | |
| 6,228,412 B1 | 5/2001 | Groux et al. | |
| 6,436,460 B1 * | 8/2002 | Daniel et al. | 426/565 |
| 6,514,555 B1 * | 2/2003 | Fayard et al. | 426/565 |
| 6,565,908 B1 * | 5/2003 | Daniel et al. | 426/565 |
| 2005/0214416 A1 | 9/2005 | Marchon et al. | |

FOREIGN PATENT DOCUMENTS

WO  WO 9938386 A1 *  8/1999

* cited by examiner

*Primary Examiner* — Steven Leff
(74) *Attorney, Agent, or Firm* — Michael P. Aronson

(57) ABSTRACT

A method of producing an extruded water-based frozen composition having a high ice content, using a screw barrel extruder having a barrel provided with an inlet and an exit die, the method comprising (a) feeding an unfrozen composition into the barrel of the extruder via the inlet thereof, the unfrozen composition comprising (i) at least 85%, preferably at least 90% by weight of the water; and (ii) at least 0.5%, preferably at least 1%, more preferably at least 2% by weight of a balance consisting of one or more other ingredients; (b) freezing the unfrozen composition inside the barrel to form the frozen composition; and (c) extruding the frozen composition through the exit die of the extruder to form said water-based frozen product; wherein at least part of the barrel is cooled with a coolant at a first temperature sufficient to form the frozen composition, and preferably the exit die is cooled with a coolant at a temperature higher than the first temperature, such that the frozen composition is still frozen but extrudable.

7 Claims, 1 Drawing Sheet

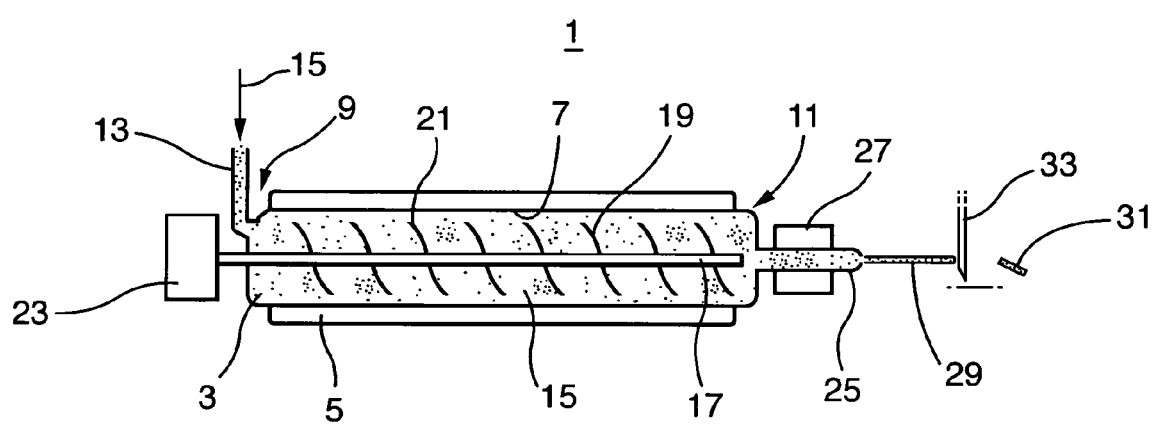

FROZEN PRODUCT AND METHOD FOR ITS PRODUCTION

FIELD OF THE INVENTION

The present invention relates to a method of extruding a water-based frozen product, for example a frozen confection, and products obtainable by that process.

BACKGROUND OF THE INVENTION

The frozen confection which is most often produced by an extrusion process is ice cream. It has a high sugar and high fat content and usually requires an emulsifier to be present in the composition. The mixture is typically subjected to high shear at a temperature of about −6° C. and is aerated to form a homogeneous dispersion of air and ice crystals. It is then typically chilled further to a temperature of around −19° C. and extruded or otherwise filled into a container.

Water ices are merely compositions comprising mainly water, typically also with sugar, colour, flavouring and stabilisers. Sorbets are aerated water ices. They contain no fat.

It is known to produce extruded ice confections which contain less fat than conventional ice-creams but unlike water ices/sorbets, they are not fat-free. This kind of product is typically prepared by making a mixture of the ingredients somewhat above freezing, for example at around 5° C. and then they are chilled to about −7° C. by a standard ice cream freezer followed by a further freezing step in a hardening tunnel to −18° C. or lower. It is also necessary for these products to be aerated prior to extrusion. Typically, they contain around 15% by weight of sugar and around 5% by weight of fat A commercial ice making machine of the kind used to produce granular ice or small chips or blocks of ice typically consists of a chilled barrel through which runs a screw transporter, e.g. as disclosed in U.S. Pat. No. 3,678,702 or U.S. Pat. No. 6,134,908. Water is fed into one end of the barrel wherein it is frozen and the resultant ice transported to an exit die where the screw chips-off pieces of ice at a temperature of typically, around −1° C.

It is also known to extrude pure ice which has been preformed as a block, using a so-called 'Instron" machine by forcing the block into a die of progressively narrowing internal diameter, whereby the resultant pressure melts the outside of the block but which then re-freezes to produce a continuous ice extrusion through the exit orifice.

U.S. Pat. No. 6,120,813 discloses "extrusion" of a fat free aerated water ice at temperatures around −5° C. from a scraped surface heat exchanger (a standard ice cream freezer). However, extrusion only refers to product exiting the heat exchanger under its own weight and/or under pressure of the incoming mixture which is to be frozen. The heat exchanger itself does not produce any force to extrude product. The resultant product is relatively soft.

US-A-2005/0214416 discloses extrusion of ice cream from a twin screw extruder, the product then being cut up and shaped into balls. It also describes that sorbets can be made in this way (when the extrusion temperature is preferably −16 to −20° C.). This kind of product is also relatively soft and has the consistency of an ice slush. US-A-2005/0214416 teaching is limited to an extruded material with a pasty consistency, while not giving any definition of what is meant by "pasty". Secondly aeration at a level of 80% to 120% is needed and thirdly water ice composition is excluded. All these differences indicate that the extrusion process is only capable of processing soft/pasty material.

U.S. Pat. No. 6,228,412 discloses a mono-screw extrusion process for manufacturing frozen aerated products, particularly ice cream. The products have a total solids content of at least 30%, much of which is sugars. Therefore the products are quite soft and do not contain high levels of ice.

U.S. Pat. No. 6,207,213 discloses the preparation of frozen concentrated milk by means of an extrusion process. The concentrated milk must have a solids content of at least 20%. This document does not relate to frozen confections.

The applicants have sought to devise a process whereby water-based frozen products with low fat content and high ice content can be produced by an extrusion process without the need for aeration. This has now been achieved by the present invention. The products so formed can be extruded as a relatively hard, unitary and continuous extrudate.

SUMMARY OF THE INVENTION

A first aspect of the present invention provides a method of producing an extruded water-based frozen composition having a high ice content using a screw barrel extruder having a barrel provided with an inlet and an exit die, the method comprising:
(a) feeding an unfrozen composition into the barrel of the extruder via the inlet thereof, the unfrozen composition comprising:
  (i) more than 85% by weight of water; and
  (ii) at least 0.5% by weight of a balance consisting of one or more other ingredients.
(b) freezing the unfrozen composition inside the barrel to form the frozen composition; and
(c) extruding the frozen composition through the exit die of the extruder to form the water-based frozen product;
wherein at least part of the barrel is cooled with a coolant at a first temperature sufficient to form the frozen composition, such that the frozen composition is frozen but extrudable.

Preferably the exit die is cooled with a coolant at a temperature higher than the first temperature, such that the frozen composition is frozen but still extrudable.

Preferably the screw barrel extruder is a single screw extruder.

Preferably the unfrozen composition comprises more than 90% by weight of water.

Preferably the unfrozen composition comprises at least 1%, more preferably at least 2% by weight of one or more other ingredients.

In a preferred embodiment of the invention the unfrozen composition contains no more than 2%, preferably no more than 1% by weight of fat, even more preferably less than 0.5% by weight of fat, most preferably containing substantially no fat.

Another aspect of the present invention provides an extruded water-based frozen product obtained by, or obtainable by a process according to the first aspect of the invention.

DETAILED DESCRIPTION OF THE INVENTION

The extruded water-based products produced by the method of the present invention are preferably substantially unaerated, most preferably having the consistency of a unified solid, such as that of pure ice or an "ice lolly" and are not in the form of an ice slurry. By "aerated" is meant that the product contains a gas, be it air or any other gas, such as nitrogen or carbon dioxide, the gas being dispersed as a gas phase emulsion within the continuous frozen phase. Although the substantially unaerated products are preferred, levels of aeration, typically up to 100%, more preferably up to 30%, still more preferably up to 5% are possible. The percentage aeration is determined as '% overrun', as will be explained in more detail herein below.

Nevertheless, the products produced by the present invention are preferably relatively hard and have a hardness at $-18°$ C. of at least 1 MPa (mega Pascals), preferably at least 5 MPa and most preferably at least 10 MPa but below 1,000 MPa. This refers to the hardness as determined by using a Hounsfield HTE hardness tester at $-18°$ C. using a 10 mm diameter probe penetrating a block of the product at a rate of 400 mm/min to a depth of 20 mm.

The products have a high ice content which is preferably expressed by a high fractional ice phase volume (FIPV). By 'ice' is meant solid frozen water.

Fractional ice phase volume is preferably determined by the method described in WO-A-98/41109. The first step in this method is to calculate amount of water that will freeze. This is done in the following way:
(a) For each ingredient of the unfrozen composition, a plot is constructed showing freezing point depression against concentration of the ingredient in water;
(b) The amount of water bound by each ingredient at temperature T can then be calculated as:

$$Wi=(100/Ci-1)\times Si$$

whereby Ci is the concentration of the ingredient i that is required to depress the freezing temperature of water to the temperature T and Si is the concentration of the ingredient in the formulation.
(c) The calculation in step (b) is repeated for each ingredient in the formulation and the total amount of bound water can then be calculated by adding up all the values Wi.
(d) The amount of water that will freeze is then calculated by subtracting the total amount of water bound from the total amount of water in the formulation.

The rest of the calculation can then be done as follows (the formulae below are somewhat simplified from the ideal theoretical calculation, but sufficiently accurate to calculate the fractional ice phase volume of the final product):
1. Using the above method, the amount of water (wt %) that will be frozen at $-18°$ C. is calculated.
2. Products prepared by the method of the present invention may be aerated but are preferably substantially unaerated. Therefore, the following part of the calculation takes into account either situation. The volume fraction of the ice in the (unaerated) product is then calculated as:

$$(p)=(\text{wt \% of water that will freeze}\times\text{density of total unaerated unfrozen composition})/(\text{density of ice}\times 100).$$

3. Similarly the initial volume fraction of the water that becomes ice is calculated as:

$$(q)=(\text{wt \% of water that will freeze}\times\text{density of total mix})/(\text{density of water}\times 100).$$

4. The total volume factor (wrt the unfrozen product) of the frozen unaerated product can then be calculated as:

$$(r) = \text{volume fraction of ice} +$$
$$(1-\text{volume of water that becomes ice})$$
$$= (p)+(1-(q)).$$

5. The fractional ice phase volume(s) of the unaerated product can be calculated by dividing the result of (p) by the result of (r):

$$(s)=(p)/(r)$$

6. If the product is aerated, however, the following adjustment is made. The fractional air phase volume is first calculated by:

$$(t)=\text{overrun \%}/(100+\text{overrun \%})$$

where overrun % is the percentage increase in volume of the frozen product relative to the volume of the unaerated and unfrozen starting composition.
7. The fractional ice phase volume (FIPV) in the aerated product is then calculated by:

$$(u) = (1 - \text{fractional air phase volume}) \times$$
$$\text{fractional ice phase volume of unaerated product}$$
$$= (1-(t))\times(s).$$

Aeration itself makes the product softer. Therefore, the preferred minimum FIPV values for products made in accordance with the invention will vary according to the degree of aeration. For example, if there is no aeration whatsoever, it is preferred that the minimum FIPV is 0.7, more preferably 0.8. Thus, the minimum value ($FIPV_{min}$) of fractional ice phase volume may be expressed as a function of the degree of aeration as determined by % overrun ($O_r$) as follows $$FIPV_{min}=0.7/(Or/100+1)$$

More preferably, the minimum value may be expressed as $$FIPV_{min}=0.8/(Or/100+1)$$

As mentioned above, most extruded water-based products of the present invention are water ices having the consistency of a unitary solid, and are therefore relatively hard. However, provided the ice content is sufficiently high (i.e. there is sufficient water in the unfrozen starting composition) other product forms are possible, for example milk-containing products such as frozen yogurt, sherbet, sorbet, ice milk and frozen custard, water-ices, granitas and frozen fruit purees. The water content of the unfrozen starting composition should be at least 85%, more preferably at least 90% by weight, most preferably up to 99% by weight.

In terms of equipment, the present invention requires the use of a screw barrel extruder having an inlet and an exit die. Preferably, the extruder has a rifled barrel. A rifled barrel is a cylindrical tube which has a scored internal surface, preferably along the entire length thereof. Preferably, this scoring is in the form of internal grooves which may have any particular geometry, for example grooves parallel to the main axis of the barrel.

A composition to be extruded is introduced into one end of the barrel. At the other end of the barrel is located an extrusion die. In simplest form, this may simply have a circular profile but may be equipped with a shaped die or die insert, for example, elliptically or having a star shaped profile, to produce a continuous length of extruded product of any desired shape in cross-section. Conveniently, at a pre-determined distance beyond the extrusion die, a cutter may be provided to cut the extruded product of the invention into predetermined desired lengths prior to packaging.

The ratio of the radial cross-sectional area of the average internal surface of the barrel to the cross-sectional area of the die exit is preferably from 1:1 to 200:1, more preferably from 1:1 to 50:1, most preferably from 1:1 to 10:1.

The barrel will be provided with chilling means, usually a cooling jacket, to cool the frozen product inside the barrel to a predetermined desired temperature. The extrusion die may be unchilled so that the temperature of the product as it leaves the barrel can rise to a somewhat higher temperature, influenced by ambient temperature.

However, in the most preferred form, the extrusion die has its own separate temperature controlled chilling means. Thus in a preferred embodiment, the present invention provides a method of producing an extruded water-based frozen product having a high ice content, using a screw barrel extruder having a barrel provided with an inlet and an exit die, the method comprising:

(a) feeding an unfrozen composition into the barrel of the extruder via the inlet thereof, the unfrozen composition comprising:
   (i) at least 85% by weight of the water; and
   (ii) at least 0.5% by weight of a balance consisting of one or more other ingredients.
(b) freezing the unfrozen composition inside the barrel to form the frozen composition; and
(c) extruding the frozen composition through a die of the extruder to form said water-based frozen product;

wherein at least part of the barrel is cooled with a coolant at a first temperature sufficient to form the frozen composition and the exit die is cooled with a coolant at a temperature higher than the first temperature such that the frozen composition is still frozen but extrudable.

In use, the extruder is operated with a barrel cooling system to cause the composition entering the barrel to become frozen. The temperature at the exit die is also controlled to be higher than the freezing temperature so that the product is still frozen but extrudable. This is generally effected by provision of separate cooling jackets, respectively disposed around the barrel and die, and through which coolant is pumped. The jacket around the barrel is optionally divided into two or more separate sections so that coolant of respective different temperatures may be pumped through each. For instance, a first section of the barrel near the inlet may be cooled to the lowest temperature, to ensure rapid and thorough cooling of the unfrozen composition. A second section of the barrel, between the first section and the die may be maintained at a higher temperature, somewhat above that of the first section. The die may then be maintained at a temperature higher still than that of the second section of the barrel but low enough for the frozen product to remain frozen yet extrudable.

It is preferred that the barrel cooling is performed such that at least over a portion of the length of the barrel and most preferably, near the exit end, the temperature of coolant is maintained at a temperature of from −35° C. to −5° C., preferably from −25° C. to −1° C., more preferably from −10° C. to −1° C. The temperature of the coolant used to control temperature at the exit of the extrusion die is preferably arranged to be from −10° C. to −1° C., preferably from −5° C. to −1° C.

A number of factors will determine the preferred or optimum temperature(s) of the barrel coolant and the die coolant. One is the amount(s) and kind(s) of material other than water which are used in the composition. For example, generally speaking the more sugar present, the lower the temperature needs to be for both barrel coolant and die coolant. In addition, some materials such as certain polyols are very effective freezing point depressants. Therefore, the presence of even small amounts of these may require much lower temperatures. The thickness and thermal conductivity of the material(s) from which the barrel and die are formed will also have an effect. Finally, the torque and operating speed of the motor driving the screw, as well as the desired final product consistency and/or storage temperature will also influence the choice of coolant temperature at each stage.

The composition in the barrel of the extruder may be formed inside the barrel by introduction of one or more product streams of suitable ingredients or it may be formed as a premix and introduced as such into the barrel. However, this product has a water content of at least 85% by weight and preferably at least 90% by weight or even at least 95% by weight of water. The maximum water content of the composition may be, for example, 99.5%, preferably 98% by weight of the total composition.

The composition also contains one or more other ingredients and certainly, no more than 2% by weight, preferably no more than 1% by weight of fat. One preferred class of such compositions is substantially free from fat. As used herein, the term 'fat' preferably means any or all of fatty acids, fatty acid esters of fatty alcohols, especially those having an average carbon chain length of $C_8$-$C_{28}$, including diglycerides and triglycerides (especially wherein each carbon chain therein independently has an average carbon chain length of $C_8$-$C_{28}$).

The other ingredients providing the balance of the composition preferably contains from 10% to 1% by weight of sugar. By 'sugar' is meant:

Monosaccharides and disaccharides,

Oligosaccharides containing from 3 to ten monosaccharide units joined in glycosidic linkage.

Corn syrups with a dextrose equivalent (DE) of greater than 20 preferably >40 and more preferably >60. Corn syrups are complex multi-component sugar mixtures and the dextrose equivalent is a common industrial means of classification. Since they are complex mixtures their number average molecular weight $<M>_n$ can be calculated from the equation below. (Journal of Food Engineering, 33 (1997) 221-226)

$$DE = \frac{18016}{<M>_n}$$

Additionally or alternatively other sweeteners may be present, e.g. polyols such as glycerol, erythritol arabitol, xylitol, sorbitol, mannitol, lactitol and malitol.

Preferably the composition comprises one or more ingredients common to a water-based frozen confection. For example, the composition comprises one or more of stabilisers, emulsifiers, flavouring agents or colouring agents or any combination thereof.

Optionally, the composition comprises a stabiliser. The stabiliser is preferably selected from the group comprising locust bean gum (LBG), guar gum, carrageenan or a combination thereof. The amount of stabiliser in the composition is preferably from 0 to 1 wt %. The minimum amount of stabiliser (if present) may be 0.01%, e.g. 0.1% by weight.

Optionally also, the composition comprises an emulsifier. Suitable emulsifiers are for example monoglycerides of fatty acids, diglycerides of fatty acids, organic acid esters of monoglycerides such as lactic, citric and acetic acids, or a combination thereof. The amount of emulsifier in the composition is preferably from 0 to 2 wt %. The minimum amount of emulsifier (if present) may be 0.01%, e.g. 0.1% by weight.

The invention will now be explained in more detail by way of the following description of a preferred embodiment and with reference to the accompanying drawings.

BRIEF DESCRIPTION OF THE DRAWINGS

The present invention will be further described with reference to FIG. 1.

FIG. 1 shows a screw barrel extruder for effecting a method according to the present invention.

DESCRIPTION OF PREFERRED EMBODIMENTS

As shown in FIG. 1, there is provided an extruder 1 which comprises a main barrel 3 surrounded by a cooling jacket 5. The barrel 3 is substantially cylindrical in interior profile and has a helical rifling along the length of its interior wall 7. The barrel 3 has an inlet end 9 and an outlet end 11. The inlet end 9 is provided with a feed pipe 13 through which a composition 15 is introduced.

Along the axis of symmetry of the barrel 3 is situated a rotatable shaft 17, a screw blade 19 is attached thereto. The outer edge 21 of the screw transporter 19 runs close to the inside surface 7 of the barrel. The rotatable shaft 17 is rotated by means of a motor 23.

As the shaft 17, and therefore, the screw transporter, 19, rotates, the composition 15 is transported from the inlet end 9 of the barrel to the outlet end 11. Here, it is extruded through an exit die 25 which is provided with its own separate temperature control jacket 27. The extruded product 29 is formed as a continuous extruded rod which is cut into predetermined lengths 31 etc. by means of a blade 33.

EXAMPLES

A screw barrel extruder with 19 mm internal diameter and a round die, optionally with a shaping die insert, was used to freeze and extrude various liquid compositions. Such equipment is commercially available from Brabander under the reference 19/25D. The product consistency was satisfactory in all cases. The overrun was always below 5%.

Example 1

Using an 8 mm Round Die Alone

| Sample | Temperature of Barrel (° C.) | Temperature of Die (° C.) | Screw rotation speed (rpm) |
| --- | --- | --- | --- |
| 10% sucrose aq. solution | −10 | −5 | 5 to 20 |
| 10% sucrose aq. solution | −15 | −3 | 5, 10, 15 |
| 10% sucrose aq. solution | −20 | −5 | 5, 10, 15 |
| 10% PMMA particles in water | −5 | −1 to −3 | 5-15 |

Example 2

Using a 5 mm Round Die Insert with the 8 mm Round Die

| Sample | Temperature of Barrel (° C.) | Temperature of Die (° C.) | Screw rotation speed (rpm) |
| --- | --- | --- | --- |
| 10% sucrose aq. solution | −20 | −1 to −3 | 5 to 15 |

Example 3

Using a 2 mm Round Die Insert with the 8 mm Round Die

| Sample | Temperature of Barrel (° C.) | Temperature of Die (° C.) | Screw rotation speed (rpm) |
| --- | --- | --- | --- |
| 10% sucrose aq. solution | −20 | −1 to −3 | 5 to 10 |

Example 4

Using a Rectangular Die Insert, 2×8 mm, with the 8 mm Round Die

| Sample | Temperature of Barrel (° C.) | Temperature of Die (° C.) | Screw rotation speed (rpm) |
| --- | --- | --- | --- |
| 10% sucrose aq. solution | −10 | −1 to −3 | 2 to 6 |

Example 5

Using a 1×25 mm Rectangular Die, to form a Wide Frozen Product Sheet, Wider than the Barrel Diameter

| Sample | Temperature of Barrel (° C.) | Temperature of Die (° C.) | Screw rotation speed (rpm) |
| --- | --- | --- | --- |
| 1% PMMA particle in water | −5 | −1 to −3 | 3-15 |
| 2% sucrose + 0.5% PMMA particle in water | −5 | −1 to −3 | 3 to 10 |
| Pineapple juice | −12 | −1 to −3 | 1 to 3 |
| 10% sucrose aq. solution 0.5% LBG, 0.6% mint | −15 to −20 | −2 to −5 | 5 to 15 |
| 10% sucrose aq. solution 0.5% LBG, 0.6% mint, 0.005% ISP | −20 | −3 to −5 | 5 to 15 |

LBG is locust bean gum. The ice structuring protein (ISP) is recombinant ocean pout type III HPLC-12 produced in yeast essentially as described in WO97/02343. PMMA is polymethylmethacrylate.

In the light of the described embodiments, modifications of those embodiments, as well as other embodiments, all within the scope of the present invention as defined by the appended claims will now become apparent to persons skilled in the art.

The invention claimed is:
1. A method of producing an extruded water-based frozen composition having a high ice content and an overrun of up to 5%, using a screw barrel extruder having a barrel provided with an inlet and an exit die, the method comprising:

(a) feeding an unfrozen composition into the barrel of the extruder via the inlet thereof, the unfrozen composition comprising:
  (i) at least 85% by weight of the water; and
  (ii) at least 0.5% by weight of a balance consisting of one or more other ingredients.
(b) freezing the unfrozen composition inside the barrel to form the frozen composition; and
(c) extruding the frozen composition through the exit die of the screw barrel extruder to form said water-based frozen product having an overrun of up to 5% wherein the frozen product so formed is a unitary and continuous extrudate having the consistency of solid ice and having a minimum Fractional Ice Phase Volume, FIPVmin, as given by:

$$FIPVmin = 0.8/(Or/100+1)$$

wherein Or is the degree of aeration as determined by % overrun; and
wherein at least part of the barrel is cooled with a coolant at a first temperature of from −35° C. to −5° C. sufficient to form the frozen composition such that the frozen composition is still frozen but extrudable, wherein the exit die is cooled with a coolant at a temperature higher than the first temperature, said temperature of the coolant at the exit die is from −5° C. to −1° C.; and wherein the screw barrel extruder is a single screw extruder.

2. A method according to claim 1 wherein the unfrozen composition contains no more than 2% by weight of fat.

3. A method according to claim 2 wherein the unfrozen composition contains substantially no fat.

4. A method according to claim 1, wherein the unfrozen composition comprises at least 90% by weight of water.

5. A method according to claim 1, wherein the unfrozen composition comprises at least 1% by weight of one or more of the other ingredients.

6. A method according to claim 1, wherein the extruded water-based frozen composition has a hardness at −18° C. of at least 1 MPa.

7. A method according to claim 6, wherein the extruded water-based frozen product has a hardness at −18° C. of at least 5 MPa.

* * * * *